(12) United States Patent
Estan et al.

(10) Patent No.: US 7,940,755 B2
(45) Date of Patent: May 10, 2011

(54) LOOKUP ENGINE WITH PROGRAMMABLE MEMORY TOPOLOGY

(75) Inventors: Cristian Estan, Madison, WI (US); Karthikeyan Sankaralingam, Madison, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 97 days.

(21) Appl. No.: 12/407,286

(22) Filed: Mar. 19, 2009

(65) Prior Publication Data

US 2010/0238942 A1     Sep. 23, 2010

(51) Int. Cl.
*H04L 12/50* (2006.01)
*H04L 12/28* (2006.01)
*H04L 12/56* (2006.01)
*H04Q 11/00* (2006.01)
*G06F 15/00* (2006.01)
*G06F 15/76* (2006.01)

(52) U.S. Cl. ......... 370/386; 370/388; 370/389; 712/10; 712/11; 712/13

(58) Field of Classification Search ........... 370/388.389, 370/386, 388, 389; 712/10, 11, 13
See application file for complete search history.

(56) References Cited

U.S. PATENT DOCUMENTS

| | | | | |
|---|---|---|---|---|
| 6,816,561 | B1 * | 11/2004 | Potter ........................... | 375/371 |
| 7,461,236 | B1 | 12/2008 | Wentzlaff | |
| 2002/0172205 | A1 * | 11/2002 | Tagore-Brage et al. . | 370/395.42 |
| 2004/0096049 | A1 * | 5/2004 | Delaney et al. ............... | 379/229 |
| 2005/0243708 | A1 * | 11/2005 | Bunyk ........................... | 370/200 |
| 2006/0041338 | A1 * | 2/2006 | Fislage ............................ | 701/1 |
| 2008/0120702 | A1 * | 5/2008 | Hokimoto ........................ | 726/4 |
| 2008/0229063 | A1 * | 9/2008 | Kleihorst et al. ............... | 712/30 |
| 2010/0169861 | A1 * | 7/2010 | Wang et al. .................... | 717/110 |

OTHER PUBLICATIONS

Hauser, J. R., & Wawrzynek, J. (1997). Garp: A MIPS processor with a reconfigurable coprocessor. In K. L. Pocek, & J. Arnold (Eds.) IEEE Symposium on FPGAs for Custom Computing Machines , (pp. 12-21). Los Alamitos, CA: IEEE Computer Society Press.*

Taylor, M. B., Kim, J., Miller, J., Wentzlaff, D., Ghodrat, F., Greenwald, B., Hoffman, H., Johnson, P., Lee, J. W., Lee, W., Ma, A., Saraf, A., Seneski, M., Shnidman, N., Strumpen, V., Frank, M., Amarasinghe, S., & Agarwal, A. (2002). The raw microprocessor: A computational fabric for software circuits and general-purpose programs. IEEE Micro , 2.*

J. S. Kim, M. B. Taylor, J. Miller, and D. Wentzlaff. Energy characterization of a tiled architecture processor with on-chip networks. In Proc. Int. Symp. Low Power Electronics and Design,pp. 424-427, Aug. 2003.*

Basu, Anindya, et al., Fast Incremental Updates for Pipelined Forwarding Engines, INFOCOM 2003, Twenty-Second Annual Joint Conference of the IEEE Computer and Communications Societies, IEEE, Mar. 3, 2003, pub. Apr. 2003, vol. 1, pp. 64-74, IEEE, New York, New York, USA.

Baboescu, F., et al., A Tree Based Router Search Engine Architecture with Single Port Memories, ISCA Proceedings of the $32^{nd}$ International Symposium on Computer Architecture, Jun. 4-8, 2005, pp. 123-133, IEEE, New York, New York.

* cited by examiner

*Primary Examiner* — Ayaz R Sheikh
*Assistant Examiner* — Tarell Hampton
(74) *Attorney, Agent, or Firm* — Boyle Fredrickson, S.C.

(57) ABSTRACT

An architecture for a specialized electronic computer for high-speed data lookup employs a set of tiles each with independent processors and lookup memory portions. The tiles may be programmed to interconnect to form different memory topologies optimized for the particular task.

22 Claims, 5 Drawing Sheets

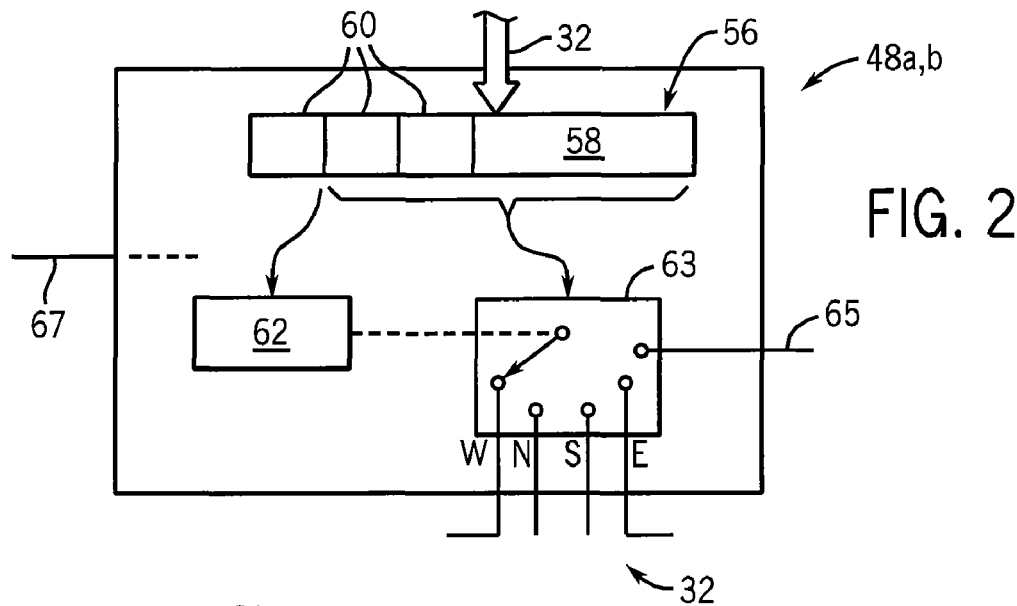
FIG. 2
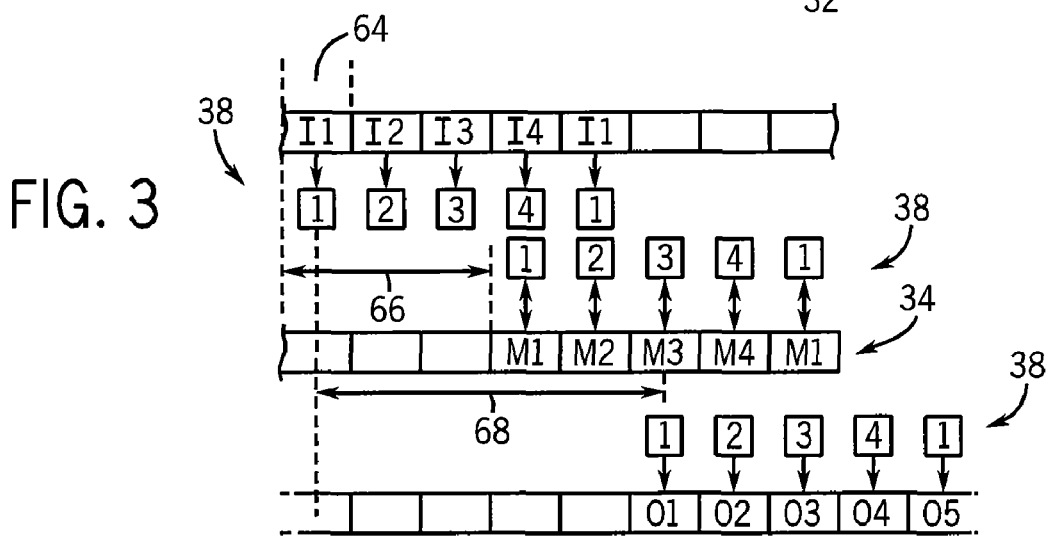
FIG. 3
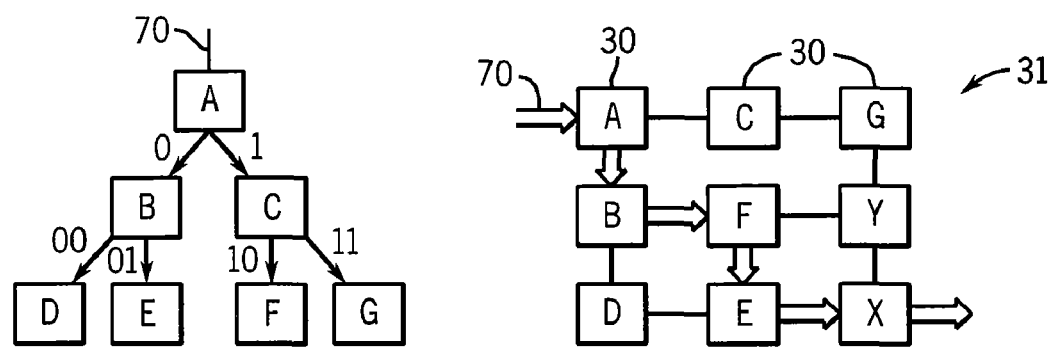
FIG. 4
FIG. 5

LOOKUP ENGINE WITH PROGRAMMABLE MEMORY TOPOLOGY

STATEMENT REGARDING FEDERALLY SPONSORED RESEARCH OR DEVELOPMENT

This invention was made with United States government support awarded by the following agency: NSF 0546585 and 0627102. The United States government has certain rights in this invention.

CROSS REFERENCE TO RELATED APPLICATIONS

--

BACKGROUND OF THE INVENTION

The present invention relates to specialized electronic devices for looking up data, such as may be used in high-speed network routers and switches and, in particular, to a device that may optimize its memory topology for different lookup tasks.

Computer networks allow the exchange of data among spatially separated computers connected by "links", the latter physically implemented as electrical conductors, fiber optics, and radio waves. The dominant network protocols work by dividing a data message into data packets, each of which contains a destination address. The destination address attached to the packets permits the packets to navigate through complex and dynamically changing networks to the destination. When particular links used by a message become crowded or disabled, packets of that message, guided by the destination address, may be routed through different links to reach their destination in a manner invisible to the sender.

A key element in implementing a network using addressed packets is a device called a router (or sometimes a switch) which reads packets' addresses and steers them according to the addresses among the different links joined by the router. For this purpose, the router employs a "routing table" matching packet addresses with ports leading to the different links. The data in the router table maybe manually programmed or may be "learned" using various router heuristics.

Routers may also perform other tasks such as address translation where the packet addresses changed for another packet address, or the management of white or blacklists where certain packets may be blocked, for example, to prevent denial of service attacks where the network is flooded with spurious packets from a given address.

All of these functions of a router require the router to look up packet addresses or other packet features in memory, and to perform these operations repeatedly and rapidly. The capacity of a router, and thus its usefulness, is largely a function of how quickly these memory lookups may be completed.

The memory lookup function may be implemented by a conventional processor reading a table implemented in random access memory. Such memories allow data to be read from identified memory addresses when the address is provided. Finding data with such an architecture requires searching through multiple addresses, a generally time-consuming process. For this reason, high performance routers may use so-called ternary content addressable memories (TCAM) which allow the entire memory to be searched in parallel for the data of interest. These memories substantially reduce the time taken for the memory lookups but are costly and consume considerable power and concomitantly generate greater amounts of heat. Both electrical usage and heat generation can be problems in large data centers.

A possible solution to the problems attendant to rapid memory lookup is the creation of specialized electrical hardware for this purpose. This task, however, is complicated by the variety of different lookup tasks that may be required in a modern router and the need to employ the router in an evolving set of network tasks. For example, currently routers may need to respond to both Internet Protocol (IP) address lookups and local area network (Ethernet-type) lookups. An IP address lookup deals with addresses that have topological significance, that is, different portions of the address represent different networks and subnetworks. For IP address lookups, a tree structure may be preferred as the tree allows successively parsing the network address in a manner that reflects the network topology. In contrast, for Ethernet-type lookups the address will typically have no topological significance, representing simply an arbitrary unique number assigned to each device. In this case, the memory lookups are better implemented using a hash table which encodes no topological information about the addresses stored and allows a simpler lookup operation.

As networks grow more complicated and routers are called upon to execute additional tasks, it is likely that current methods for processing packets will prove sub-optimal and changes to the data structures used by routers during packet processing will be needed. Current method of packet processing may also be sub-optimal for new protocols, extensions to existing protocols, or the introduction of new features for packet processing.

SUMMARY OF THE INVENTION

The present invention provides a specialized circuit for performing lookup operations. In this circuit, the memory of a lookup table is divided into "tiles" each associated with a set of specialized processors optimized for memory lookup tasks. Importantly, connections between the tiles may be changed by programming allowing the memory topology to be flexibly changed to match the particular problem being addressed. Thus, for example, when a tree type lookup is required, the memory tiles may be interconnected in a tree form. Alternatively, when a hash table lookup is required, the memory tiles may be connected in parallel ranks suitable for hash tables. Arbitrary other topologies may be formed. By permitting the memory structure to be programmably modified, the trade-offs between high speed and flexibility are successfully navigated for both current and future router tasks.

Specifically, in one embodiment, the present invention provides a network router for routing data packets in a network comprising a series of ports receiving and transmitting data packets and a general-purpose processor communicating with the series of ports to provide for network routing functions including packet processing but exclusive of some data packet lookup functions. The router further includes a data packet lookup engine communicating with the general-purpose processing program to conduct memory lookups based on information provided by the general-purpose processor. This data packet lookup engine includes a set of inter-communicating computational tiles, each tile including at least one lookup processor and a memory comprising a portion of a look-up table accessible uniquely by the tile. The tiles include interconnection circuitry and program memory, the latter holding instructions which define a static topology of interconnection among the tiles through the interconnection circuitry during operation of the router.

It is thus an object of the invention to provide a distributed memory architecture that allows the topology of the individual memory elements to be programmably configured.

Each tile may include a set of lookup processors activated in a fixed sequence so that different lookup processors handle successive arrivals of data at the tile.

It is thus another object of the invention to permit a pipelining architecture in a distributed memory system. The use of successive processors makes it possible to achieve a consistent throughput for the pipeline.

The arrival of data at a lookup processor may trigger execution of the program instructions from the corresponding program memory and the lookup processor may go idle once the program instructions have been completed until the next arrival of data at the lookup processor.

It is thus an object of the invention to permit an overprovisioned multiple processor system while managing energy consumption to only those processors employed in the computational task at a given time.

The lookup processors may provide only integer computational support without branch prediction and the program memories are less than 256 instructions long.

It is thus an object of the invention to provide extremely simple lookup processors permitting practical implementation of a large number of lookup processors in a tile.

The lookup processors may provide an instruction set having program instructions to implement a function of routing data to specific other tiles dependent on the outcome of a memory lookup.

It is thus an object of the invention to permit the convenient programming of memory topology by way of the programming of the individual lookup processors.

The interconnection circuitry may not provide buffering of transmitted data or flow control.

It is thus an object of the invention to produce an architecture that allows for static collision-free routing that may be predetermined at the compilation stage greatly simplifying the circuitry and producing a robust and deterministic operation.

The interconnection circuitry may route data among the tiles according to a routing header applied to the data by the lookup processor according to an execution of the program instructions.

It is thus an object of the invention to provide a simple but flexible mechanism for communicating between the lookup processors and extremely simple interconnection circuitry.

The interconnection circuitry may route data between the tiles according to a routing header associated with the data and the interconnection circuitry may follow static programmed rules in interpreting the header to route the data.

It is thus an object of the invention to permit intercommunication among tiles with minimal processing overhead.

The interconnection circuitry may route data among the tiles according to a routing header associated with the data identifying a final destination for the data where the data will be processed by a lookup processor. Data may also be processed by intermediate tiles on the path to the final destination if the routing header indicates that multicast handling is requested.

It is thus an object of the invention to permit a simple rectilinear organization of the tiles into rows and columns having only direct communication with adjacent tiles while permitting more complex routing through the agencies of intervening tiles.

The interconnection circuitry may provide at least two physically distinct channels between a tile and the other tiles to which it is connected by channels, each channel providing independent input and output pathways.

It is thus an object of the invention to provide a system with extremely versatile static routing and zero likelihood of collision.

The invention may further include a compiler executing on an independent electronic processor generating program instructions for each of the lookup processors. The program instructions may include (1) at least one instruction reading a register associated with data received at the tiles; (2) at least one instruction reading the memory associated with the tile; and (3) at least one instruction sending data to another tile. The compiler may further include a routing analyzer analyzing a path and timing of data among tiles to detect at least one of: (i) collisions among data being transmitted among the tiles; (ii) conflicting demands for processing by lookup processors of a tile; and (iii) direct transmission from one tile to a nonadjacent tile.

Thus, it is another object of the invention to produce an architecture that permits predetermined static routing at the compiler level.

The network router may further include a general-purpose processor communicating with the series of ports to provide for network routing functions including packet processing but exclusive of some data packet lookup functions. The lookup processors may have a reduced instruction set with respect to this general-purpose processor.

Thus, it is an object of the invention to provide an architecture that may be specifically dedicated to lookup tasks allowing other network activities to be executed by a general processor.

The interconnection circuits may manage communication among the tiles on the communication links by transmitting data at regular intervals synchronized with the interconnection circuits of other tiles and by following static rules interpreting destination information provided by the lookup processors.

It is thus an object of the invention to produce a deterministic routing technique amenable to static routing.

These particular objects and advantages may apply to only some embodiments falling within the claims and thus do not define the scope of the invention.

BRIEF DESCRIPTION OF THE FIGURES

FIG. 2 is a logical diagram of the interconnection circuitry of each tile serving to arrange the tiles for a particular task;

FIG. 3 is a timing diagram depicting sequential activation of the lookup processors of a tile in pipeline processing;

FIG. 4 is a logical diagram of an example tree type memory lookup task that may be implemented with the present invention;

FIG. 5 is an interconnection diagram of a simple set of tiles of the present invention arranged to implement the example lookup task of FIG. 4;

DETAILED DESCRIPTION OF THE PREFERRED EMBODIMENT

Figure 1:
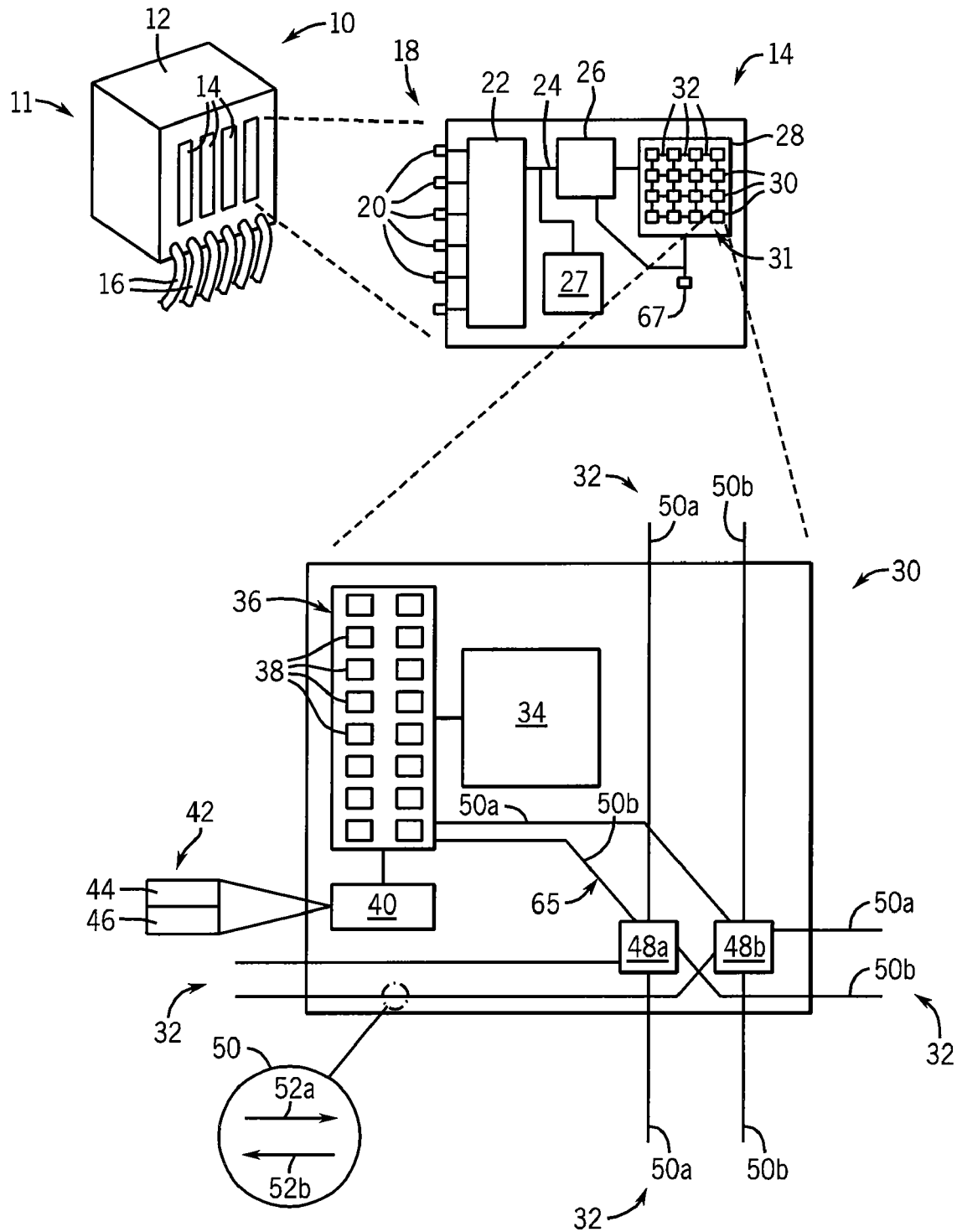
FIG. 1 is a series of successive, increasingly detailed diagrams of a router per the present invention, the router composed of line cards each using a lookup engine having multiple tiles, the figure showing the principal elements of each tile including interconnection circuitry joining the tiles together and multiple lookup processors operating on a shared memory.

Referring now to FIG. 1, a router unit 10 may include a housing 12 holding multiple line cards 14 typically arranged in modular fashion to connect to a common backplane 11 within the housing 12. The backplane 11 connects the line cards to network media 16, for example electrical conductors, optical fiber, or radio transceivers each representing different links or ports interconnected by the router unit 10.

Each line card 14 implements a router or switch and provides multiple ports 20 at a rear connector 18 that may connect with the backplane 11 for the receipt and transmission of data packets from and to the network media 16. Each port 20 is received by network interface circuitry 22 on the line card 14, the network interface circuitry 22 handling data level and link level network protocols. The network interface circuitry 22 in turn connects to an internal bus 24 communicating with a general-purpose or network processor 26 (henceforth general purpose processor) and memory 27. Memory 27 may include a combination of volatile and nonvolatile memory and holds an effective operating system for the line card 14 and programs executed by the general-purpose processor 26 for managing router functions of the type generally understood in the art.

The general-purpose processor 26 communicates with a special-purpose lookup engine 28 of the present invention, for example, using a coprocessor type interface in which the general-purpose processor 26 passes distinct memory lookup tasks to the lookup engine 28. After a known number of cycles, the lookup engine 28 returns the results of that data lookup.

Referring still to FIG. 1, the lookup engine 28 is composed of multiple tiles 30 arranged in an array 31 of rows and columns that intercommunicate using a communication grid 32, the latter which connects each tile to its immediate neighbors (e.g. east, west, north, south) for the intercommunication of data as will be described.

Each tile 30 holds a portion of a lookup memory 34, the lookup memory implementing, for example, a router table or a whitelist or blacklist that can be indexed by information from a data packet. The lookup memory 34 may be standard random access memory.

The portion of the lookup memory 34 in each tile 30 is addressable only by a set 36 of lookup processors 38 in that tile 30, each lookup processors 38 which may independently access lookup memory 34. The lookup processors 38 may be highly reduced instruction set processors or other architectures that may efficiently implement the steps that will be described below. In one embodiment, lookup processors provide only integer computational support without branch prediction. Thus, the lookup processors 38 will provide an instruction set much reduced from the general-purpose processor 26 with an eye toward minimal complexity and reduced power consumption. Each lookup processor 38 can execute instructions to read and write one or more associated registers, perform a memory read of lookup memory 34, and to apply routing headers to data derived from that lookup based on the results of the lookup. Importantly, the lookup processors 38 may conditionally assign a destination (of another tile) to data based on the outcome of an instruction operation. Thus, the program and language permits branch instructions to be implemented by choice of destination in the passing of data among tiles as well as by conventional branching among instructions within the individual tile.

The instructions executed by the lookup processors 98 are held in a common programmable memory 40 holding one or more programs 42 that are generally identically shared among multiple lookup processors 38. In one embodiment, the firmware memory may be less than 256 instructions long. The programs 42 will include code blocks 44 executed by the lookup processors 38 when they are activated, as will be described, and topology data 46 indicating where the results of the execution of the code blocks 44 will be sent upon completion. Practically, the code blocks 44 and topology data 46 may be jointly implemented by a single set of instructions which perform reads of lookup memory 34 and, based on the results of the lookup, apply headers to data packets to route them to other tiles 30.

This interconnection of the tiles 30 with other tiles 30 in the array 31 using the grid 32 and with the general-purpose processor 26 is managed via interconnection circuits 48a and 48b that provide two physically independent interconnections 50a and 50b within the communication grid 32 between each tile 30 and its neighbor. Each interconnection 50a and 50b provides two conductors 52a and 52b providing for data flowing into the tile 30 and out of the tile 30 respectively so that there is no interference between incoming and outgoing data. Thus, each interconnection circuit 48a and 48b provides interconnections 50a and 50b to each adjacent tile (if any) to the east (right) of the given tile 30, to the west (left) of the given tile 30, to the north (above) of the given tile 30 and to the south (below) of the given tile 30. Tiles 30 at the edge of the array 31 of tiles 30, for example having no adjacent neighbors in at least one direction, may communicate directly with the general-purpose processor 26 to receive or transmit data in similar fashion. One more interconnection 50a and 50b is provided from the interconnection circuits 48a and 48b with the set 36 of lookup processors 38 so that data passing among tiles 30 may be either routed through the tile 30 or routed to the tile 30 depending on its routing header.

Referring now to FIG. 2, the interconnection circuits 48 provide for a simple address-based routing of a received data packet 56 arriving on the communication grid 32. The data packet 56 will generally include a payload 58 having the results of the calculation or read of lookup memory 34 of that tile 30 and one or more address headers 60 describing the destination of the payload 58 through the array 31 of tiles and the code block 44 to be executed at the destination tile when the payload 58 arrives. One header 60 may provide a multicast flag as will be described. The data packet 56 is received along the grid 32 from one of up to four directions (east, west, north, south). The particular direction may be ignored (as depicted) or monitored to implement a collision management scheme as will be described below.

The data packet 56 is parsed by the interconnection circuit 48 at each tile 30 receiving the data packet 56 to read the address header 60 (indicating its destination) which is provided to a decoder 62 operating according to a static set of rules that may be preprogrammed and consistent among the tiles 30 to control a logical single-pole, five-throw routing switch 63 allowing the remainder of the data packet 56 (the payload 58 plus other routing headers 60 exclusive of the topmost address header) to be routed either east, west, north, south, or to the instant tile 30. For tiles 30 within the array 31, each of the first four directions will be to an adjacent tile 30; however, for tiles 30 at the edge of the array 31, one of these directions may represent general-purpose processor 26. When the address header 60 for an incoming message is the address of the instant tile 30 receiving the message, the data is routed to the instant tile 30 along the fifth throw 65.

For data packets 56 that are not being sent to an adjacent tile 30, the interconnection circuit 48 at the non-destination tile 30, may follow a simple set of rules to further route the data packet 56. In one embodiment, the interconnection circuit 48 determines whether the destination tile 30 is in the same row as the interconnection circuit 48. If so, the interconnection circuit 48 routes the data packet 56 to the east. Otherwise, the interconnection circuit 48 routes the data packet 56 to the south. This simple set of rules together with knowledge by the interconnection circuit 48 of the location of its tile 30 within the array 31 allows data packets 56 to be sent to non-adjacent tiles 30 over several clock cycles.

In one embodiment, a form of multicasting may be implemented by the addition of a multicasting flag in the header 60. This multicasting flag indicates to each interconnection circuit 56 receiving the data packet that the payload 58 should be both forwarded to the destination tile 30 and used by the given tile 30 of the interconnection circuit 56.

The interconnection circuits 30 may also implement a form of collision management by providing a predetermined priority among packets received from different directions on the grid 32. Thus, for example, in the event of simultaneously arriving data packets 56 from the north and the east at a given tile 30, the given tile 30 may give priority to the data from the north while ignoring the east data. This provides for increased programming flexibility by permitting collision resolution to be used to select among competing data flows.

Referring to FIGS. 1 and 2, data may be sent through the array 31 along the interconnection circuits 48 in serial fashion under the control of the cycle clock 67 (shown in FIG. 1) generally having clock edges that control not only the execution of instructions by the processors 38 but also each "hop" in data transfer between tiles 30. The routing of the data may thus be preplanned statically by a compiler as will be described so that there is no need for the detection of collisions and retransmission of messages as in the conventional network. For this reason interconnection circuits 48a and 48b need not provide for buffering, flow control, or complex network protocols that retransmit in the event of collision. Flow control, as used herein, refers to communications among the tiles 30 to control the rate of transmission between tiles 30 so that a fast sending tile 30 does not overrun a slow sending tile 30 on the grid 32.

Synchronized by the cycle clock 67, the general-purpose processor 26 may provide lookup requests to the lookup engine 28 and receive the results a fixed number of cycles later. The lookup request is received from an edge tile 30 and the same or different edge tile may return the result. Multiple tiles 30 typically are involved in the lookup process, each of the tiles 30 executing the code blocks 44 to look up data from lookup memory 34 and forward the results to another tile 30 or the general-purpose processor 26.

At each tile 30 involved in the computation, data received by interconnection circuit 48a or 48b for that tile 30 is routed to an uncommitted lookup processor 38 in a simple sequence that cyclically routes among each of the lookup processors 38. When the lookup processor 38 receives its data, it begins execution of the code block 44 in memory 40, and before that time the lookup processor 38 is idle conserving power. Lookup processors 38 that are currently executing a code block 44 complete instructions synchronized to the cycle clock 67 and transmit data through the interconnection circuits 48a and 48b also synchronized to the cycle clock 67. The lookup processors 38 select the interconnection circuit 48a and 48b for transmission of data and apply headers for future routing of the data per the topology data 46 that has been prepared to prevent data collisions by a compilation process to be described.

Referring now to FIGS. 1 and 3, during a set of clock cycles 64 input data I1-I5 may be received at successive clock cycles by a given tile 30. Circuitry associated with the set 36 of lookup processors 38 will allocate the input data to successive lookup processors 38 numbered 1-4 in this simplified example using only four lookup processors 38. More typically, the invention contemplates the use of 16 or more lookup processors 38 to provide for efficient pipeline processing.

After a first delay 66 being a fixed number of cycles 64 determined by the number of instructions of the code block 44 being executed by the lookup processors 38 before memory access, the lookup processors 38 will begin memory accesses M1-M4 staggered in time as a result of the staggered receipt of input data I1-I5 and the identical program being executed by each of the lookup processors 38. This staggering prevents interference in memory accesses and high utilization of the lookup memory 34.

After a tile delay 68 determined by the number of instructions of the code block 44 after memory access, output data O1-O4 is provided by each of the lookup processors 38 in staggered fashion for transmission to the next tile 30 or the general-purpose processor 26. The output data O1-O4 will carry with it addresses derived from the topology data 46 (typically based on the results of the lookup) allowing this output data to be properly routed. A static sum of the delays 66 and 68 for the different tiles 30 involved in the lookup provides a fixed pipeline delay permitting the general-purpose processor 26 to identify the results of its lookup requests previously forwarded to the lookup engine 28.

The code block 44 associated with a given tile 30, and thus with the multiple processors 38 of the tile 30, may be characterized in that the resource consuming instructions, defined as: the send instruction (sending data to another tile 30), load instruction (reading memory 34) and save instruction (writing memory 34), are all the same number of clock cycles from the beginning of the program of the code block 44. In this way, conflicts in access of memory 34 or transmitting data among the processors 38 are simply avoided. In other words, because the processors 38 begin the code block 44 at successive times, their access to resources is correspondingly staggered.

Referring now to FIG. 4, it will be understood that the present architecture, by virtue of the ability to freely interconnect the tiles 30, allows the topology of the memory of the lookup table divided among lookup memories 34 to be programmably reorganized for effective processing. For example, a memory lookup problem, for example for an IP address, may be logically represented in a tree structure as shown in FIG. 4. In this memory lookup process, incoming IP address data 70 may have three address fields (here represented as a single bit) compared successively at three different levels in the tree. Thus, for example, a first address field may be evaluated with respect to data in memory portion A to identify a network. Depending on the results of that evaluation the second address field identifying a sub-network may be compared to data contained in memory portions B or C (depending on the results of the determination at A). At the third level of the tree, a third field representing a lower-level sub-network may be compared to data contained in memory portions D, E, F, or G (depending on the previous evaluations).

Efficient implementation of this tree structure can be done by connecting tiles associated with memory portions A-F in a similar tree using the grid 32 between the tiles 30. Thus, referring to FIG. 5, which shows an example tile array 31 of three rows in three columns, the IP address data 70 may be received at tile A in the upper left-hand corner of the array 31 which may be programmed to connect to tiles 30 at the second row, first column and first row, second column representing memory portions B and C respectively. Likewise memory portions D and E logically related to memory portion B may be implemented by tiles in the third row, first column, and third row, second column, respectively, adjacent to memory portion B and connected thereto by means of the interconnection circuits 48. Similarly, memory portions F and G related to memory portion C may be implemented by tiles in the second row, second column, and first row, third column adjacent to the tile implementing memory portion C.

Thus, the tiles 30 may be assigned to memory portions as follows:

| A | C | G |
|---|---|---|
| B | F | Y |
| D | E | X | where the tiles labeled Y and X perform no processing but simply provide a conduit interconnecting the tiles. This assignment of tiles to logical memory structures provides one possible organization of the tiles 30 for tree type calculations and significantly one that improves the efficiency of the calculation by allowing pipelining type processing. Other arrangements are also possible.

Figure 6:
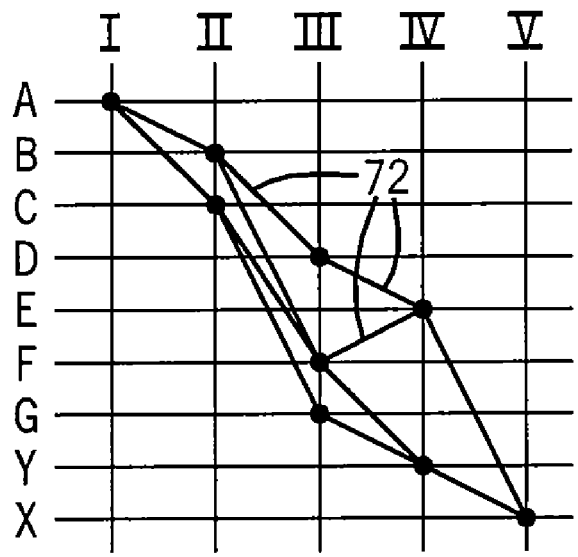
FIG. 6 is a "train schedule" showing the movement of data among the tiles for the example lookup task of FIG. 4

Referring to FIG. 6, the passage of data among tiles 30 in this example may be represented in a "train schedule" chart in which the particular tiles are arrayed on the vertical axis and clock cycles are indicated on the horizontal axes in the manner of stations and schedule times in a train chart. The passage of data through the array 31 is represented by trajectories 72. Bifurcations in trajectories 72 represent different branches of the tree of FIG. 4, for example, at the A node during the first clock cycle I, at the C node during the second clock cycle II, etc. Ultimately the data from all trajectories 72 converge at tile X for communication back to the general-purpose processor 26.

Importantly, the schedule of FIG. 6 shows all possible data trajectories 72 for any traversal of the tree of FIG. 4 thus permitting the routing of data to be statically planned by a compiler to ensure consistent delay between the arrival of data at the tile A and its exit at tile X regardless of the trajectories 72 (simplifying the pipelining process) and in more complicated examples of limiting collisions between data passing through tiles 30. It is important to note in this example that only one trajectory 72 from a given tile will be traversed at a time and hence places where trajectories 72 converge on a tile do not represent conflicts in network communication.

Figure 7:
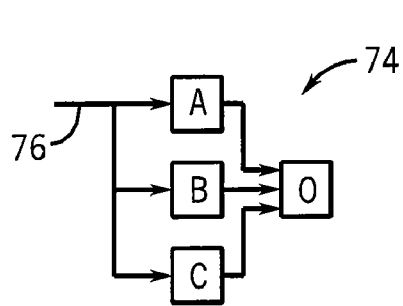
FIG. 7 is a figure similar to that of FIG. 4 showing a logical diagram of an example memory hash lookup task.
Figure 8:
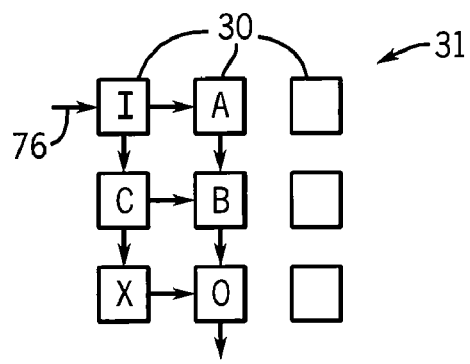
FIG. 8 is a figure similar to that of FIG. 5 showing an interconnection diagram of a simple set of tiles of the present invention arranged to implement the example lookup task of FIG. 6.

Referring now to FIG. 7, a different memory lookup problem may make use of the completely different memory topology. Consider now a hash table 74 that may be used for Ethernet-type address lookups. Such a hash table 74 may provide for the parallel interrogation of memory blocks A, B, and C using a hash code of the argument 76. The results from each of the memory portions A, B, and C are then assessed at a logical Or-gate. Referring to FIG. 8, this topology may also be implemented through the tiles 30 of the present invention. In this case the hashed value of the argument 76 may be received by an input tile I in the upper left-hand corner of the array 31 which may be programmed to connect to the other tiles providing memory portions A, B, and C in parallel per of the hash table topology of FIG. 7. Thus, memory portions A and C may be assigned to tiles in the first row, second column and second row, first column respectively, to connect directly to the tile I while memory portion B may be assigned to a tile in the second row, second column communicating indirectly with tile I via the tile implementing memory portion A acting as a conduit. The results from each of the tiles representing memory portions A, B, and C may then be routed to a tile O for evaluation of the results (whether any individual hash tables have a matching entry) and output to the general-purpose processor 26. Thus, the tiles may be arranged as follows

Figure 9:
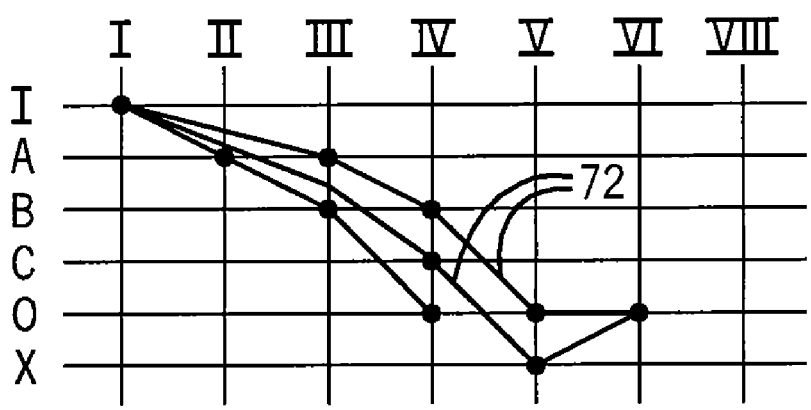
FIG. 9 is a figure similar to that of FIG. 6 showing the movement of data among the tiles for the example lookup task of FIG. 7.

| I | A | — |
|---|---|---|
| C | B | — |
| X | O | — | where tile X serves in this example only for routing. The train schedule for this example is shown in FIG. 9 and differs from the example of FIG. 6 in that each of the trajectories 72 is executed simultaneously and thus collisions in the grid 32 and conflicts in processor demands can occur. Initially, node I must transmit the data to be hashed to the tiles representing memory portions A, B, and C in three sequential operations. In this example during the first clock cycle II after receipt of the data at tile I, the tile for memory portion A receives the data. During the second clock cycle III, the tile for memory portion A receives the data for the tile representing memory portion B (as a conduit) and, at a third clock cycle IV, node C receives the data from node I and node B receives the data from node A. Node O then receives the results from nodes A, B, and C over clock cycles IV, V, and VI to provide an output to the processor 26 at VII.

Figure 11:
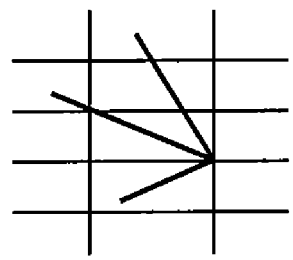
FIG. 11 is a detailed train schedule used by the compiler to identify tile interconnection problems.

Referring to FIG. 11, these simple examples can be routed with no collisions even with a single connection between each tile 30; however, it will be understood that messages may be sent over either the first or second interconnections 50a and 50b further eliminating the risk of collision. In addition, data may be routed through unused nodes or tiles 30 to provide for synchronization or effective buffering of the data through the machine. Generally the routing must be performed to conform with the topology of rows and columns of the tiles 30; that is, (1) data may only move from a given tile to an adjacent tile in one clock cycle, (2) only one data packet may be received by a given tile for processing in one clock cycle, and (3) at most two data packets may arrive at a given tile at a given clock cycle.

Figure 10:
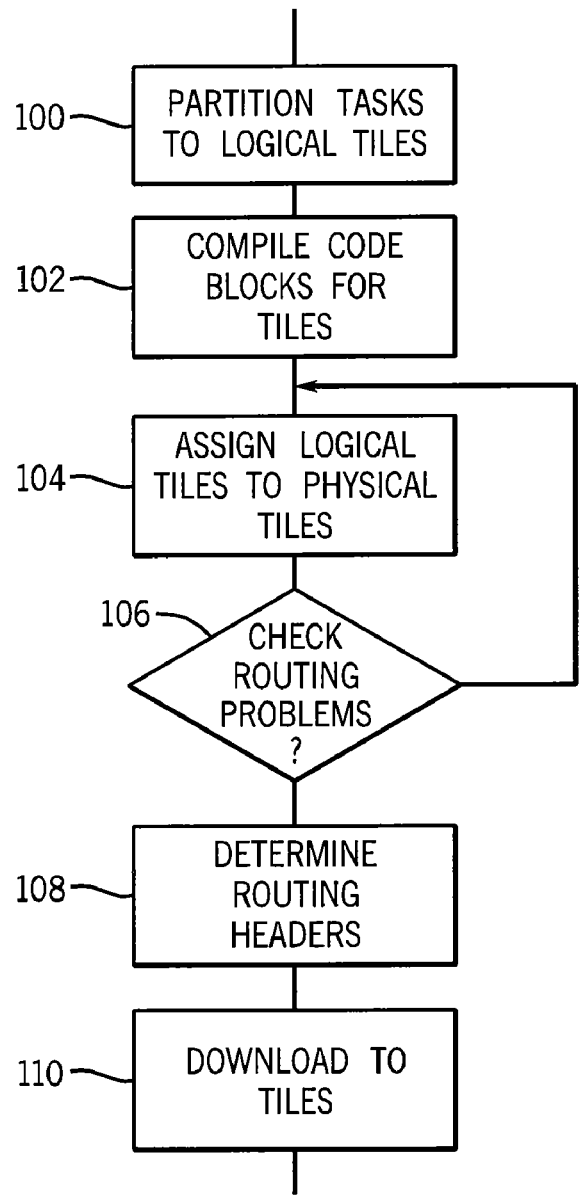
FIG. 10 is a flowchart for a compiler program executing to create programs to be implemented by the lookup processors of the tiles of the present invention.

Referring now to FIG. 10, the architecture of the present invention, as noted above, makes it possible to programmably reconnect the tiles 30 to optimize memory lookup problems in a way that permits the static avoidance of routing problems such as described above. This static routing solution may be fully embodied in the code blocks 44 and topology data 46 which together define the operation of the lookup processors 38 generated at the time of compilation.

The compiling process performed by a program executing typically but not necessarily on a separate processor, may, as indicated by process block 100, begin by partitioning lookup tasks to particular logical memory blocks solely and uniquely accessed by those operations. This partitioning process may be done automatically or may allow the user to identify logical memory blocks.

At process block 102, the code blocks associated with the lookups of each logical memory block are written and compiled according to particular instruction sets of the lookup processors 38. Up to this point, there is no need to relate the memory blocks to particular tiles 30.

At process block 104, the logical memory blocks are assigned to two physical tiles 30 either automatically or with input from the user. In either case, at process block 106 the assignment is evaluated, for example, by generating the logical equivalent train schedule described above to check for routing collisions, adjacency problems, or the conflicts in the need for resources of the processors 38. Conflicts may be corrected automatically by the compiler, for example using a trial and error process, or other iterative process or techniques known in the art.

At process block 108, based on the routing selected, the topology data 46 entries are computed and, at process block 110, the code blocks 44 and topology data 46 are loaded in to the memory of each of the tiles 30.

Figure 12:
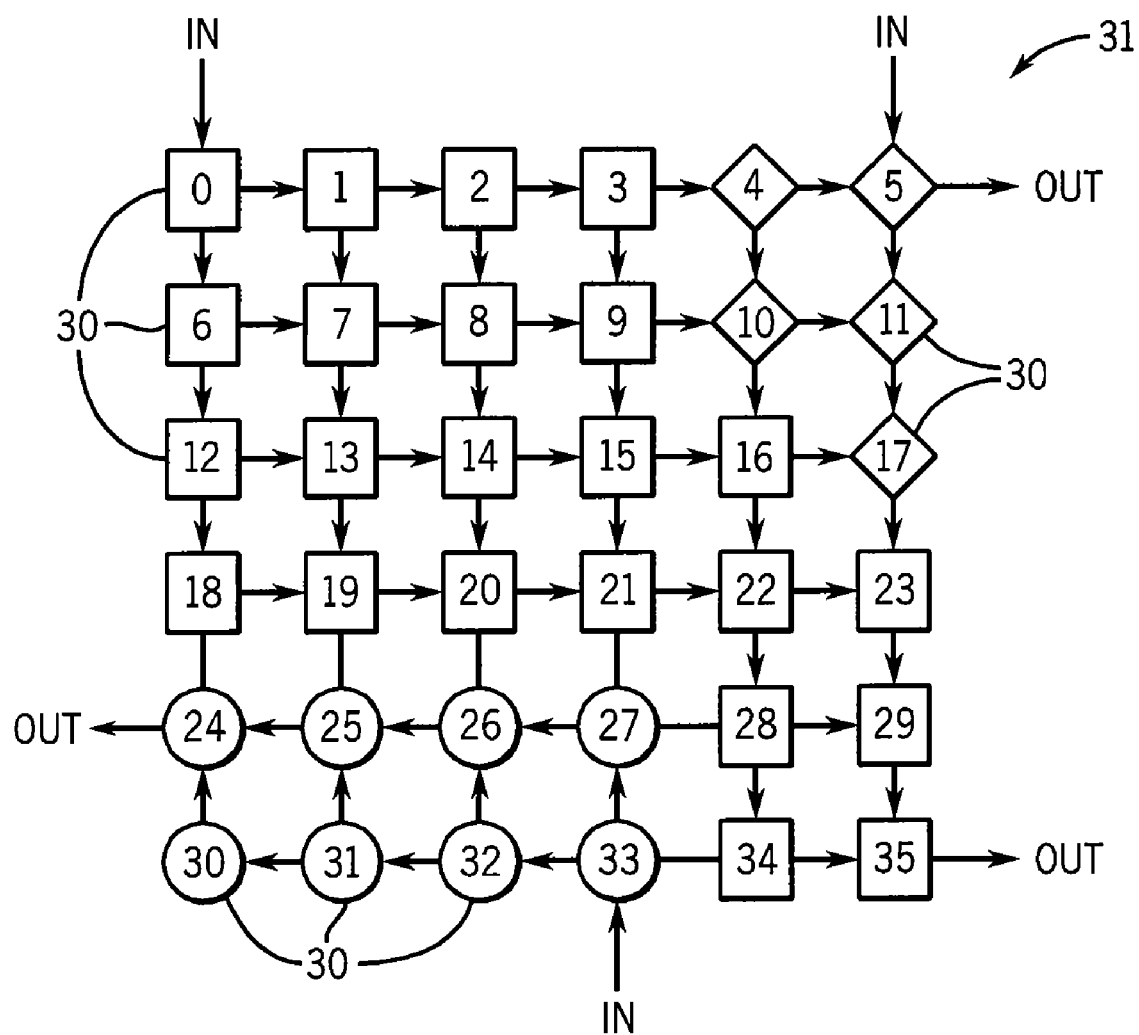
FIG. 12 is a diagram similar to that of FIGS. 5 and 8 showing simultaneous execution of different lookup tasks on the lookup engine of the present invention.

Referring now to FIG. 12 it will be understood that to the extent that the tiles 30 operate independently, multiple different lookup problems can be executed by the array 31 simultaneously. This permits, for example, the generation of a router that may decode both IP addresses and the local Ethernet addresses in a gateway type application. In this case, the tiles 30 marked by a rectangle represent those undertaking an IP lookup while the tiles 30 marked by a diamond are tiles implementing a packet classification process, and tiles 30 marked by a circle are those implementing a hash table for Ethernet lookup.

The architecture of the present invention can generally perform lookup operations and specifically lookup operations associated with packet types or addresses. Thus, it can be used not only for routing packets but also for packet classification, deep packet inspection for security applications, and network address translation.

The term router used herein should be understood broadly to include any device providing for packet processing and thus not only routers but also devices that are often referred to as switches.

It should be understood that the invention is not limited in its application to the details of construction and arrangements of the components set forth herein. The invention is capable of other embodiments and of being practiced or carried out in various ways. Variations and modifications of the foregoing are within the scope of the present invention. It also being understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention.

We claim:

1. A network router for routing data packets in a network comprising:

a series of ports receiving and transmitting data packets;

a general-purpose processor communicating with the series of ports to provide for network routing functions including packet processing but exclusive of some data packet lookup functions;

a packet lookup engine communicating with the general-purpose processor to receive data therefrom and to conduct memory lookups based on the data, the packet lookup engine comprising a set of intercommunicating computational tiles each tile including:

(1) a set of lookup processors providing elemental memory lookup functions, each lookup processor associated with a program memory for holding program instructions;

(2) a lookup memory holding packet related data and accessible by the set of lookup processors executing the elemental memory lookup functions; and (3) interconnection circuitry managing intercommunication of data between the tiles;

wherein the program instructions include:

(1) at least one instruction reading a register associated with data received at the tiles;

(2) at least one instruction reading the lookup memory associated with the tile; and (3) at least one instruction sending data to another tile;

wherein the program instructions when executed prevent at least one of:

(i) collisions among data being transmitted among the tiles;

(ii) conflicting demands for processing by lookup processors of a tile; and (iii) direct transmission from one tile to a nonadjacent tile.

2. The network router of claim 1 wherein an arrival of data at a lookup processor triggers execution of the program instructions from a corresponding program memory and wherein the lookup processor is idle once the program instructions have been completed until a next arrival of data at the lookup processor.

3. The network router of claim 1 wherein the lookup processors provide an instruction set having program instructions to implement a function of routing data to specific other tiles dependent on an outcome of a memory lookup of look up memory.

4. The network router of claim 1 wherein the lookup processors are sequenced so that different lookup processors handle successive arrivals of data at the tile.

5. The network router of claim 1 wherein the lookup processors provide only integer computational support without branch prediction.

6. The network router of claim 1 wherein the interconnection circuitry does not provide buffering of transmitted data.

7. The network router of claim 1 wherein the interconnection circuitry does not provide flow control that coordinates a rate of data transmission among tiles.

8. The network router of claim 1 wherein the interconnection circuitry routes data among the tiles according to a routing header applied to the data by the lookup processor according to an execution of the program instructions.

9. The network router of claim 1 wherein the interconnection circuitry routes data between the tiles according to a routing header associated with the data and the interconnection circuitry follows static programmed rules in interpreting the header to route the data.

10. The network router of claim 1 wherein the interconnection circuitry routes data among the tiles according to a routing header associated with the data and identifying a final destination tile for the data where the data will be processed by a lookup processor.

11. The network router of claim 1 wherein the interconnection circuitry routes data among the tiles according to a routing header indicating a multicasting of the data and a destination tile for the data, causing the routed data to be processed by all tiles receiving the data before the receipt of the data by the destination tile.

12. The network router of claim 1 wherein the interconnection circuitry provides at least two physically distinct channels between a tile and the other tiles to which it is connected by channels, each channel providing independent input and output pathways.

13. The electronic processor of claim 1 wherein the lookup processors are programmed so that different tiles represent different nodes of a lookup tree.

14. The electronic processor of claim 1 wherein the lookup processors are programmed so that different tiles represent different ranks of a hash table address.

15. A network router for routing data packets in a network comprising:
   a series of ports receiving and transmitting data packets;
   a general-purpose processor communicating with the series of ports to provide for network routing functions including packet processing but exclusive of some data packet lookup functions;
   a packet lookup engine communicating with the general-purpose processor to receive data therefrom and to conduct memory lookups based on the data, the packet lookup engine comprising a set of intercommunicating computational tiles each tile including:
   (1) a set of lookup processors providing elemental memory lookup functions, each lookup processor associated with a program memory for holding program instructions;
   (2) a lookup memory holding packet related data and accessible by the set of lookup processors executing the elemental memory lookup functions; and
   (3) interconnection circuitry managing intercommunication of data between the tiles
   further including a compiler executing on a an independent electronic processor generating program instructions for each of the lookup processors, the program instructions including:
   (1) at least one instruction reading a register associated with data received at the tiles;
   (2) at least one instruction reading the memory associated with the tile; and
   (3) at least one instruction sending data to another tile;
   wherein the compiler includes a routing analyzer analyzing a path and timing of data among tiles to detect at least one of:
   (i) collisions among data being transmitted among the tiles;
   (ii) conflicting demands for processing by lookup processors of a tile; and
   (iii) direct transmission from one tile to a nonadjacent tile.

16. A network router for routing data packets in a network comprising:
   a series of ports receiving and transmitting data packets;
   a general-purpose processor communicating with the series of ports to provide for network routing functions including packet processing but exclusive of some data packet lookup functions;
   a data packet lookup engine communicating with the general-purpose processing program to conduct memory lookups based on information provided by the general-purpose processor, the data packet lookup engine comprising a set of intercommunicating computational tiles, each tile including at least one lookup processor and a memory comprising a portion of a look-up table accessible uniquely by the tile, wherein the tiles include interconnection circuitry and programmable memory, the programmable memory receiving instructions which provide a static topology of interconnection among the tiles through the interconnection circuitry during operation of the router
   wherein the instructions in the programmable memory include:
   (1) at least one instruction reading a register associated with data received at the tiles;
   (2) at least one instruction reading the lookup memory associated with the tile; and
   (3) at least one instruction sending data to another tile;
   wherein the program instructions when executed prevent at least one of:
   (i) collisions among data being transmitted among the tiles;
   (ii) conflicting demands for processing by lookup processors of a tile; and
   (iii) direct transmission from one tile to a nonadjacent tile.

17. The network router of claim 16 wherein each tile includes a set of lookup processors activated in a fixed sequence so that different lookup processors handle successive arrivals of data at the tile.

18. The network router of claim 16 wherein an arrival of data at a lookup processor triggers execution of the program instructions from the corresponding program memory and wherein the lookup processor is idle once the program instructions have been completed until a next arrival of data at the lookup processor.

19. The network router of claim 16 wherein the lookup processors provide only integer computational support without branch prediction.

20. The network router of claim 16 wherein the interconnection circuitry does not provide buffering of transmitted data.

21. The network router of claim 16 wherein the interconnection circuitry routes data among the tiles according to a routing header applied to the data by the lookup processor according to an execution of the program instructions.

22. The network router of claim 16 wherein the interconnection circuitry may receive data from other tiles from different directions, and wherein the interconnection circuitry establishes a priority among the different directions to accept data from a first direction and ignore data from a second direction when the data from the first and second directions arrives at the same time.

* * * * *